United States Patent
Brewer et al.

(10) Patent No.: US 8,364,365 B2
(45) Date of Patent: Jan. 29, 2013

(54) METHOD AND APPARATUS FOR DETERMINING A REFERENCE VEHICLE VELOCITY AND A REAR WHEEL SPEED IN A VEHICLE HAVING THREE SPEED SENSORS

(75) Inventors: Michael Brewer, Royal Oak, MI (US);
Todd Brown, Dearborn, MI (US);
Thomas Salmon, Rochester, MI (US)

(73) Assignee: Ford Global Technologies, Dearborn, MI (US)

( * ) Notice: Subject to any disclaimer, the term of this patent is extended or adjusted under 35 U.S.C. 154(b) by 444 days.

(21) Appl. No.: 10/710,248

(22) Filed: Jun. 29, 2004

(65) Prior Publication Data

US 2005/0288842 A1    Dec. 29, 2005

(51) Int. Cl.
*G06F 17/00* (2006.01)
*B60T 8/24* (2006.01)
*B60T 8/66* (2006.01)
*B60L 3/00* (2006.01)

(52) U.S. Cl. ............ 701/70; 701/72; 303/140; 303/169; 180/271

(58) Field of Classification Search .................. 701/36, 701/37, 38, 41, 45, 46, 48, 70, 72; 340/429, 340/440, 441, 438; 303/146, 187, 121, 122.01, 303/138, 139, 140, 147, 169, 170, 171, 186, 303/189, 192; 180/197, 170, 271, 282
See application file for complete search history.

(56) References Cited

U.S. PATENT DOCUMENTS

| | | | | |
|---|---|---|---|---|
| 4,998,593 A | * | 3/1991 | Karnopp et al. | 180/408 |
| 5,813,732 A | * | 9/1998 | Monzaki et al. | 303/146 |
| 5,822,709 A | * | 10/1998 | Fujita | 701/70 |
| 5,826,951 A | * | 10/1998 | Sano | 303/146 |
| 5,944,393 A | * | 8/1999 | Sano | 303/146 |
| 6,021,382 A | * | 2/2000 | Greenwell et al. | 702/148 |
| 6,079,800 A | * | 6/2000 | Lin et al. | 303/146 |
| 6,081,761 A | * | 6/2000 | Harada et al. | 701/72 |
| 6,356,188 B1 | | 3/2002 | Meyers et al. | |
| 6,593,849 B2 | | 7/2003 | Chubb et al. | |
| 6,923,514 B1 | * | 8/2005 | Spieker et al. | 303/199 |
| 6,954,140 B2 | * | 10/2005 | Holler | 340/438 |
| 7,142,969 B2 | * | 11/2006 | Inagaki | 701/70 |
| 2002/0030406 A1 | * | 3/2002 | Poggenburg et al. | 303/146 |
| 2002/0087247 A1 | * | 7/2002 | Tanaka et al. | 701/70 |
| 2004/0010383 A1 | | 1/2004 | Lu | |
| 2004/0064246 A1 | | 4/2004 | Lu | |
| 2004/0167701 A1 | * | 8/2004 | Mattson et al. | 701/71 |
| 2004/0236490 A1 | * | 11/2004 | Kin | 701/70 |
| 2005/0131604 A1 | * | 6/2005 | Lu | 701/38 |

* cited by examiner

*Primary Examiner* — Thomas Tarcza
*Assistant Examiner* — Edward Pipala
(74) *Attorney, Agent, or Firm* — Angela M. Brunetti; Raymond L. Coppiellie

(57) ABSTRACT

The method for controlling a safety system (102-108) of a vehicle (10) determines a reference velocity from a first front wheel sensor (20A) and a second front wheel speed signal from a second front wheel sensor (20B). An axle speed sensor (20C) may be used to determine an axle speed signal. A first rear speed signal and a second rear speed signal are determined from the reference velocity, a slip effect and a yaw signal. The yaw signal may be determined from a yaw rate sensor (28). Safety system (102-108) may be controlled in response to the first rear wheel speed signal and the second rear wheel speed signal.

21 Claims, 3 Drawing Sheets

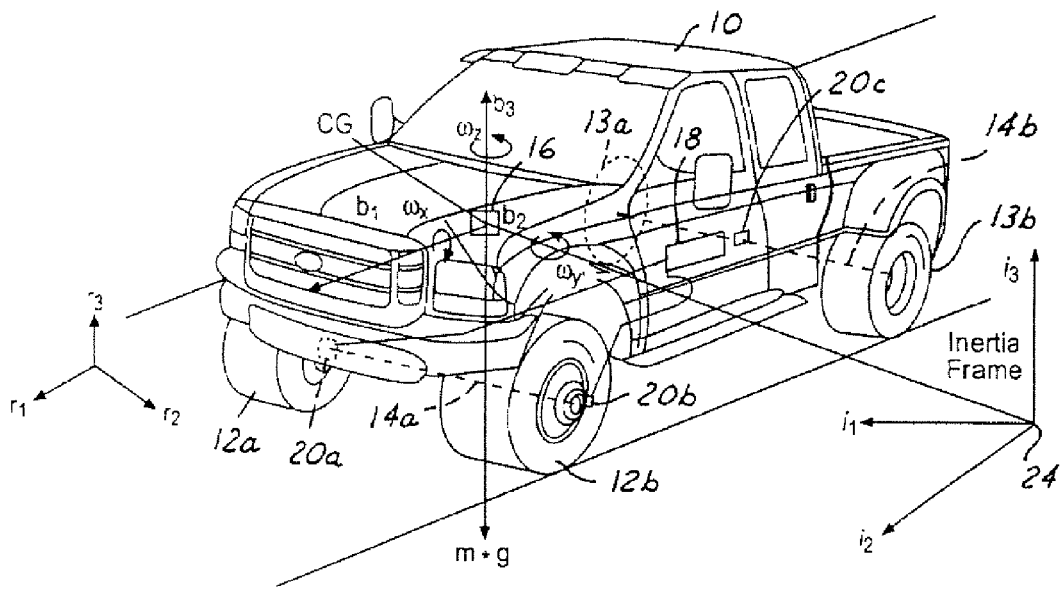
FIG.1
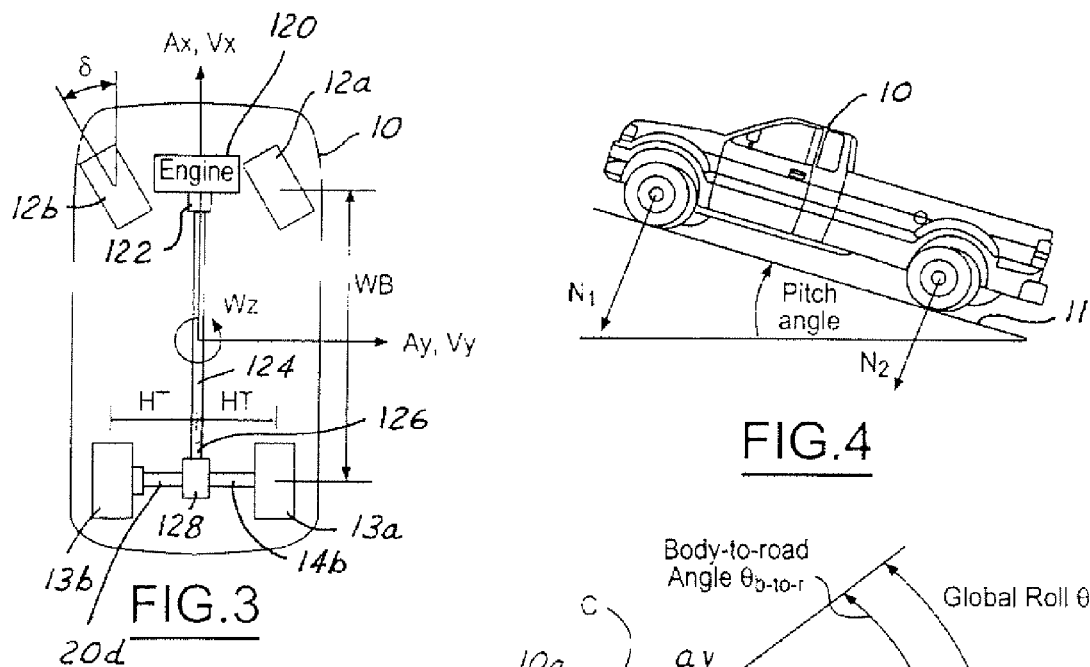
FIG.3
FIG.4
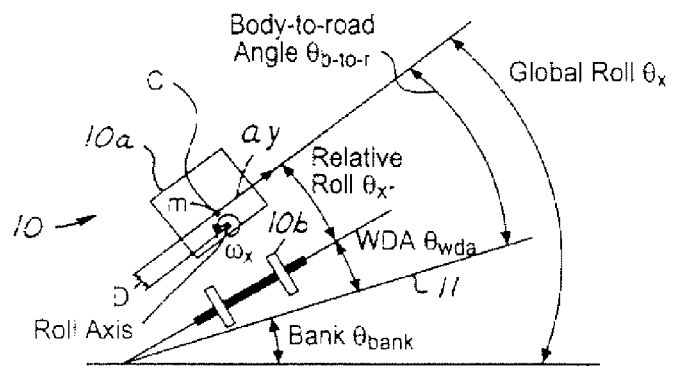
FIG.5

METHOD AND APPARATUS FOR DETERMINING A REFERENCE VEHICLE VELOCITY AND A REAR WHEEL SPEED IN A VEHICLE HAVING THREE SPEED SENSORS

BACKGROUND OF INVENTION

The present invention relates generally to a dynamic control system for an automotive vehicle, and more particularly, to a system for determining a vehicle velocity.

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Typically, the dynamic control systems do not address roll of the vehicle. For high profile vehicles in particular, it would be desirable to control the rollover characteristics of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the body on a plane or nearly on a plane parallel to the road surface. Rollover control is used to maintain the vehicle wheels on the road surface.

In roll control systems, typically four-wheel speed sensors are used. The wheel speed sensors are used to determine the reference velocity of the vehicle. Because four-wheel sensors are used, each of the rear wheel speeds is known. In some systems, it may be desirable to reduce cost and not provide a separate wheel speed sensors, particularly for the rear wheels.

It would therefore be desirable to provide a system for determining a reference vehicle velocity and a rear-wheel velocity for each of the rear wheels from a system employing only three speed sensors.

SUMMARY OF INVENTION

The present invention employs two front wheel speed sensors and a rear axle speed sensor that is used for determining the reference velocity of the vehicle.

In one aspect of the invention, a method of controlling a vehicle safety system comprises determining a reference velocity from a first front wheel signal, a second front wheel speed signal and a drive signal such as an axle speed signal. The method further includes determining a first rear wheel velocity and a second rear wheel velocity from the reference velocity, a slip effect and a yaw signal. The method further controls the safety system in response to the first rear wheel speed signal and a second rear wheel speed signal.

In a further aspect of the invention, a method of determining a reference velocity comprises determining a first reference velocity, determining a first front wheel speed signal and a second front wheel speed signal, determining a rear axle speed, determining whether the vehicle is accelerating or whether the vehicle is decelerating, when the vehicle is accelerating, setting a second reference velocity as a highest undriven wheel velocity, determining an updated vehicle velocity in response to longitudinal acceleration, when the vehicle is decelerating and wheel speeds are potentially unreliable, setting the second reference as a maximum of the updated vehicle velocity, the first front wheel speed signal or the second front wheel speed signal and when the vehicle is decelerating and wheel speeds are reliable, setting the second reference velocity as a maximum of the first front wheel speed signal or the second front wheel speed signal when the front wheel signal is greater than the rear speed, or setting the second reference velocity as the rear speed when the rear speed is less than the first reference velocity.

One advantage of the invention is the increased accuracy of the reference velocity determination. Once the reference velocity is determined, the rear wheel speeds of each of the rear wheels may be determined accurately. The rear wheel speed may take into account a slip effect, a yaw effect and/or both.

Another advantage of the invention is that the method set forth herein can handle large dynamic maneuvers and multiple wheel speeds that are in deep slip. This is important for dynamic control systems for which the wheel speeds of each of the rear wheels must be known.

Another advantage of the invention is that one less wheel speed sensor is required and, therefore, the cost of the overall sensor set is reduced.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 1 is a perspective view of an automotive vehicle on a road surface having a control system according to the present invention.

FIG. 3 is a top view of a vehicle with various parameters labeled thereon.

FIG. 4 is a side view of a vehicle on a grade.

FIG. 5 is a side view of a vehicle on a road bank.

DETAILED DESCRIPTION

Figure 2:
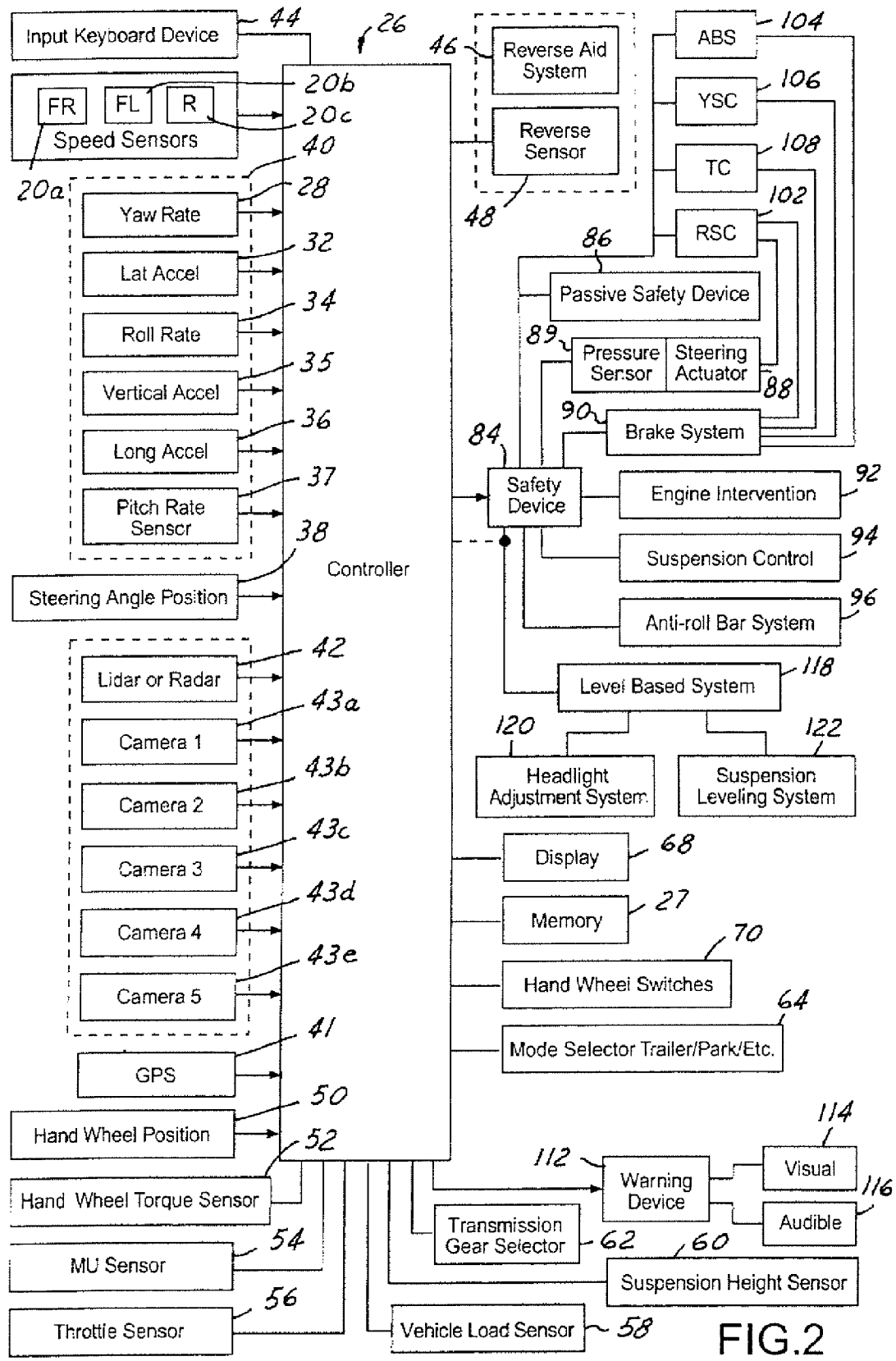
FIG. 2 is a diagrammatic view of a control system according to the present invention.

In the following figures, the same reference numerals will be used to identify the same components. The various terms and values are set forth by way of example and are not meant to be limiting unless specifically set forth in a claim. The following description is set forth with respect to an axle speed. However, other drive speeds may be used such as a driveshaft speed.

Referring to FIG. 1, an automotive vehicle 10 with a control system of the present invention is illustrated. Vehicle 10 has front right and front left tires 12a and 12b and rear right tires 13a and rear left tires 13a and 13b, respectively. The vehicle 10 may also have a number of different types of front steering systems 14a including having each of the front wheels configured with a respective controllable actuators and the front wheels having a conventional type system in which both of the front wheels are controlled together. The vehicle has a rear axle system 14b. Generally, the vehicle has a weight represented as Mg at the center of gravity of the vehicle, where g=9.8 m/s$^2$ and M is the total mass of the vehicle.

The sensing system 16 may share sensors with other vehicle dynamic control systems such as a yaw stability control system sensor set or a roll stability control system sensor set. Of course, the actual sensors used will vary depending on the type of control system or systems implemented on the particular vehicle. The various possible sensors will be further described below. The wheel speed sensors 20 may be mounted as adjacent each wheel of the vehicle. Those skilled in the art will recognize three wheel speed sensors may be used. For example, one for the rear of the vehicle and one for each of the front two wheels. The remaining sensors of sensing system 16 are preferably mounted directly at the center of gravity of the vehicle, along the reference directions x, y and z shown in FIG. 1. As those skilled in the art will recognize, the frame from $b_1$, $b_2$ and $b_3$ is called a body reference frame 22, whose origin is located at the center of gravity of the car body, with the $b_1$ corresponding to the x axis pointing forward, b corresponding to the y axis pointing off the left side, and the $b_3$ corresponding to the z axis pointing upward. The angular rates of the car body are denoted about their respective axes as $\omega_x$ for the roll rate, $\omega_y$ for the pitch rate, and $\omega_z$ for the yaw rate. The present invention calculations preferably take place in an inertial frame 24 that may be derived from the body reference frame 22 as described below.

As will be described below, the sensing system 16 may also include a lidar, radar and/or sonar sensor(s), camera(s), a GPS system and various other sensors.

The angular rate sensors and the accelerometers are mounted on the vehicle along the body frame directions $b_1$, $b_2$ and $b_3$, which are the x-y-z axes of the vehicle's sprung mass.

The longitudinal acceleration sensor is mounted on the vehicle located at the center of gravity, with its sensing direction along the $b_1$-axis, whose output is denoted as $a_x$. The lateral acceleration sensor is mounted on the car body located at the center of gravity, with its sensing direction along $b_2$-axis, whose output is denoted as $a_y$. The vertical acceleration sensor is mounted on the car body located at the center of gravity, with its sensing direction along $b_3$-axis, whose output is denoted as $a_z$.

The other reference frames used in the following discussion includes the road reference frame, as depicted in FIG. 2. The road reference frame system $r_1 r_2 r_3$ is fixed on the driven road surface at any instant in travel time of the vehicle, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles.

Referring now to FIG. 2, control system 18 is illustrated in further detail having a controller 26. Controller 26 in this case may be a single centralized vehicle controller or a combination of controllers. If many controllers are used they may be coupled together to communicate various information therebetween, and arbitration and prioritization among multiple controllers might also be performed. Preferably, the controller 26 is microprocessor-based.

The controller 26 may be programmed to perform various functions and control various outputs. Controller 26 may also have a memory 27 associated therewith. Memory 27 may be a stand-alone memory or may be incorporated within the controller 26. Memory 27 may store various parameters, thresholds, patterns, tables or maps. For example, a map of how much brake-steer to generate in response to steering wheel rate and vehicle velocity may be stored in memory. Such maps may be calibratable during vehicle development.

The controller 26 is used for receiving information from a number of sensors, which may include speed sensors 20, a yaw rate sensor 28, a lateral acceleration sensor 32, a roll rate sensor 34, a vertical acceleration sensor 35, a longitudinal acceleration sensor 36, a pitch rate sensor 37, and steering angle position sensor 38. Sensors 28-38 may be part of an inertial measurement unit 40 or IMU.

In one embodiment, the sensors 28-37 are located at the center of gravity of the vehicle. Those skilled in the art will recognize that the sensors may also be located on various locations off the center of gravity and mathematically translated equivalently thereto.

Roll rate sensor 34 and pitch rate sensor 37 may be used to sense the vehicle roll and pitch conditions. The roll and pitch conditions of the vehicle might be conducted based on sensing the height of one or more points on the vehicle relative to the road surface. Sensors that may be used to achieve this include a radar-based proximity sensor, a laser-based proximity sensor and a sonar-based proximity sensor.

Roll and pitch conditions of the vehicle may also be sensed based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll and pitch conditions may also be sensed by sensing the force or torque associated with the loading condition of one or more suspension or chassis components including a pressure transducer in an active air suspension, a shock absorber sensor such as a load cell, a strain gauge, the steering system absolute or relative motor load, the steering system assist pressure, a tire laterally force sensor or sensors, a longitudinal tire force sensor, a vertical tire force sensor or a tire sidewall torsion sensor.

The roll and pitch condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor 35, a vehicle longitudinal acceleration sensor 36, lateral or vertical speed sensors including a wheel-based speed sensor, a radar-based speed sensor, a sonar-based speed sensor, a laser-based speed sensor or an optical-based speed sensor.

Lateral acceleration, roll and pitch orientations and velocities may be obtained using a global positioning system (GPS) 41.

The controller 26 may also be coupled to a lidar, radar, or sonar 42. The lidar, radar, or sonar 42 may be used to generate a velocity signal or relative velocity signal of an object. The radar or lidar may also be used to generate a trajectory signal of an object. Likewise, the velocity of the vehicle in various directions may be obtained relative to a stationary object. A lidar, radar, or sonar sensor 42 may be mounted in various positions around the vehicle including the front, sides and/or rear. Multiple sensors 42 may also be employed in multiple locations to provide multiple information from multiple positions of the vehicle. Such signals may also be used in a self parking condition.

Controller 26 may also be coupled to a camera system 83 having cameras 43*a*-43*e*. A stereo pair of cameras 43*a*, 43*b* may be mounted on the front of the vehicle to detect target objects in front of the vehicle, to measure the object size, range and relative velocity and to classify those objects into appropriate categories. Camera 43*c* may be mounted on the right side of the vehicle, camera 43*d* may be mounted on the left side of the vehicle, and camera 43*e* may be directed rearward of the vehicle. Camera 43*e* may also include a stereo pair of cameras. All or some of the cameras may be used in a commercial embodiment. Also, a stereo pair of cameras 43a, 43b may be replaced by a single camera (43a or 43b) depending on the roll and pitch conditions measured by the system. Various types of cameras would be evident to those skilled in the art. Various types of cameras such as a CMOS-type camera or a CCD-type camera may be implemented to generate various image signals. As will be further described below, the various image signals may be analyzed to determine the various dynamic conditions of the vehicle.

Controller 26 may also be coupled to an input device 44. Input device 44 may include a keyboard or other push button type device. Input device 44 may be used to enter various parameters or variables indicate to the controller a selection or other inputs.

A reverse aid system 46 having at least one reverse aid sensor 48 may be coupled to controller 26. Reverse aid sensor 48 may be but is not limited to an ultrasonic sensor, a radar sensor, or a combination of the two. Reverse aid sensors 48 are typically located at several locations of the rear of the vehicle such as in the bumper. As will be further described below, the reverse aid system 46 may be used to provide an indication as to the presence of a trailer and may also be used to generate a particular pattern with respect to the trailer to allow the controller to have feedback with respect to the position of the trailer.

A hand wheel (also known as "steering wheel") position sensor 50 may also be coupled to controller 26. Hand wheel position sensor 50 provides controller 26 with a signal corresponding to the relative rotational position of the steering wheel within the vehicle. Various types of sensors include absolute sensors and position sensors using a center find algorithm (relative sensors). Relative sensors may use the centerfind algorithm to determine the position relative to a center position once the position is known. Both types of sensors may provide a steering angle rate signal and/or a steering direction signal. For example, the steering direction may indicate away from or toward a center position or end stop position.

A hand wheel torque sensor 52 may also be coupled to controller 26. Hand wheel torque sensor 52 may be a sensor located within the steering column for direct measurement. The steering torque may also be inferred from data available to the power steering system. The hand wheel torque sensor 52 generates a signal corresponding to the amount of torque placed on the hand wheel (steering wheel within the vehicle).

A mu (μ) sensor 54 may also be coupled to controller 26. Mu sensor 54 may be a direct sensor or, more likely, is a calculated value based on available inputs. Various systems such as a yaw control system for an anti-lock brake system may generate mu. Mu is an indication of the coefficient of friction of the surface on which the vehicle is traveling. The mu sensor 54 may be used to generate a coefficient of friction for the vehicle or the coefficient of friction at more than one contact patch of the tire. Preferably, a mu is determined at each contact patch of each tire.

A throttle sensor 56 may also be coupled to controller 26. Throttle sensor 56 may, for example, be a resistive sensor. Of course, other types of throttle sensors would be evident to those skilled in the art. Throttle sensor 56 generates a signal corresponding to the position of the throttle of the vehicle. The throttle sensor 56 may give an indication as to the driver's intention regarding acceleration. Throttle sensor may also be part of a drive-by-wire type system. A throttle type sensor may also be used in electric vehicles and vehicles with diesel engines to determine the desire acceleration. These sensors may take the form of a pedal sensor.

A vehicle load sensor 58 to sense the amount of weight or payload within the vehicle may also be coupled to controller 26. Vehicle load sensor 58 may be one of various types of sensors including a suspension sensor. For example, one load sensor may be located at each suspension component. Load sensor 58 may, for example, be a pressure sensor in an air suspension. The load sensor 58 may also be a load cell. In any case, the vehicle load sensor 58 generates an electrical signal corresponding to the load on the vehicle. One sensor or preferably one sensor for each corner of the vehicle may be used. The vehicle load may, for example, be the normal load at each corner of the vehicle. By knowing the normal load at each corner of the vehicle, the total amount of loading on the vehicle may be determined.

A suspension height sensor 60 may also be coupled to controller 26. Suspension height sensor 60 may be a suspension height sensor located at each corner of the vehicle. Suspension height sensor 60 may also be part of an air suspension or other type of active suspension. Suspension height sensor 60 generates a height signal corresponding to the extension of the suspension. The suspension height sensor 60 may also be used to determine the vehicle load, normal load, and payload distribution, rather than using vehicle load sensor 58 described above. Suspension height sensor 60 may be one of various types of sensors including a laser, optical sensor, or the like.

A transmission gear selector 62 may also be coupled to controller 26. Transmission gear selector 62 may, for example, comprise a shift lever that has the PRNDL selections corresponding to the park, reverse, neutral, regular drive and low drive positions of the transmission. Also, an electrical signal may be generated in response to the position of the shift lever of a manual transmission.

A mode selector 64 may also be coupled to controller 26. Mode selector 64 may select a driver selectable mode selector such as a manually activated mechanism (e.g., push button or the like) or a voice recognition system. Mode selector 64 may, for example, select a position that corresponds to trailering. Also, mode selector may determine a park position indicating that the vehicle operator intends to park the vehicle. A U-turn position may also be selected. The mode selector may be used to enable or disable a particular function of the vehicle.

A display 68 may also be coupled to controller 26. Display 68 displays various types of displays or combinations of displays. Display 68 may display the various conditions of the vehicle such as the inputs from the input device 44, mode selector indicators from mode selector 64, and turn signal actuator 66. Display 68 may be a light on a dash panel or part of a more complex LED or LCD display on the instrument panel of the vehicle. Of course, other locations for the display may include an overhead display or the like.

Hand wheel switches 70 may be coupled to the steering or hand wheel. Hand wheel switches 70 may be labeled to activate or deactivate various functions or systems.

Based upon inputs from the sensors and/or cameras, GPS, and lidar or radar, controller 26 may control a safety device 84. Depending on the desired sensitivity of the system and various other factors, not all the sensors 20, 28-66, cameras 43a-43e, lidar or radar 42, or GPS 41 may be used in a commercial embodiment. Safety device 84 is part of a vehicle subsystem control. Safety device 84 may control a passive safety device 86 such as an airbag, a pressure sensor 89, a steering actuator 88, or a braking actuator 90 at one or more of the wheels 12a, 12b, 13a, 13b of the vehicle. Engine intervention 92 may act to reduce engine power to provide a safety function. Also, other vehicle components such as a suspension control 94 may be used to adjust the suspension and provide for various types of control in dynamic conditions. An anti-roll bar system 96 may be used to prevent rollover. The anti-roll bar system 96 may comprise a front or rear active anti-roll bar, or both. It should also be noted that the systems 88-96 may act alone or in various combinations. Certain systems 88-96 may act to provide a safety function when various dynamic conditions are sensed.

Steering actuator 88 may include the position of the front right wheel actuator, the front left wheel actuator, the rear left wheel actuator, and the right rear wheel actuator. As described above, two or more of the actuators may be simultaneously controlled. For example, in a rack-and-pinion system, the two wheels coupled thereto are simultaneously controlled.

Safety device 84 may also comprise a roll stability control system 102, an anti-lock brake system 104, a yaw stability control system 106, and/or a traction control system 108. The roll stability control system 102, anti-lock brake system 104, yaw stability control system 106, and traction control system 108 may be coupled to brake system 90. Further, these systems may also be coupled to steering actuator 88. Engine intervention 92 may also be coupled to one or more of the devices, particularly the roll stability control system, yaw stability control system, and traction control system. Thus, the steering actuator 88, brake system 90, engine intervention 92, suspension control 94, and anti-roll bar system 96 may be part of one of the dynamic control systems 102-108. As will be further described below, the yaw stability control system 106 may have thresholds that are set by the controller 26 and that may be changed based upon the various conditions of the vehicle such as a trailering condition.

A warning device 112 may also be coupled to controller 26. Warning device 112 may warn of various conditions such as an impending rollover, understeer, oversteer, an approach of an in-path object, or impending trailer interference during a reverse direction. The warnings are provided in time for the driver to take corrective or evasive action. The warning device 112 may be a visual display 114 such as warning lights or an alpha-numeric display such an LCD screen. Display 114 may be integrated with display 68. The warning device 112 may also be an audible display 116 such as a warning buzzer, chime or bell. The warning device 112 may also be a haptic warning such as a vibrating steering wheel. Of course, a combination of audible, visual, and haptic display may be implemented. A blinking light or display may be used to indicate the actual steering angle versus the steered wheel angle. That is, the light may come on solid when the steering is enhanced by the control system and blinks when less than the steering angle is being accomplished such as on a low mu surface.

A level-based system 118 may also be coupled to controller 26. Level-based system 118 uses the pitch level or angle of the vehicle to adjust the system. Level-based system 118 may, for example, be a headlight adjustment system 120 or a suspension leveling system 122. Headlight adjustment system 120 adjusts the beam pattern downward for a loaded vehicle. Suspension leveling system 122 adjusts the suspension at the various corners of the vehicle to maintain the vehicle relatively level to the road. The level-based system 118 may also make an adjustment based on the roll angle of the vehicle.

Referring now to FIG. 3, automotive vehicle 10 is illustrated having variables placed on that are used below. Vehicle 10 is shown from a top view looking downward with the front wheels 12A and 12B by an angle δ. Vehicles moving forward with a velocity $V_x$ may have an acceleration $A_x$. A lateral acceleration and velocity are $A_y$ and $V_y$ respectively. The half-track (HT) of the vehicle is the distance between the center of the vehicle and the center of the wheelbase of the wheel is the distance between the center of the front wheel and the center of the rear wheel. The yaw rate $\omega_z$ is also illustrated.

An engine 120 is also illustrated coupled to a transmission 122. The transmission 122 is coupled to a driveshaft 124, which in turn drives axle 14b through differential 128. A driveshaft sensor 126 is coupled to the shaft 124 and is used to generate a rotational speed signal corresponding to the rotational speed of the driveshaft. The driveshaft sensor 126 may be located at various positions along driveshaft including within the differential 128 and transmission 122. The speed of the driveshaft may easily be used to derive an axle speed because the gearing of the differential 128 is known. In the following description, drive speed refers to a speed of either the axle or driveshaft.

Referring now to FIG. 4, vehicle 10 is illustrated on road surface 11 has a pitch angle illustrated. Normal loads N1 and N2 illustrate the normal loads at each of the wheels.

Referring now to FIG. 5, vehicle 10 is illustrated on a road surface 11 with a wheel departure angle between the road surface 11 and a lifted wheel. The reference velocity and velocity for the rear wheel, as will be described below, may be used to determine the presence of a lifted wheel. The relative roll angle is the angle between the body 10a and suspension 10b of the vehicle 10.

The following description is broken into two parts. The first part determines the reference velocity for the entire vehicle. The second part uses the reference velocity to determine individual wheel speeds for the rear wheels of a rear wheel drive vehicle. The rear wheels of a rear wheel drive system may be referred to as driven wheels since they are driven by the engine. The front wheels following this example are steered wheels. The steered wheels may also be referred to as undriven wheels.

Reference Velocity

This portion of the present invention calculates a reference velocity for a rear wheel drive vehicle with only three speed signals. (Two front wheel speeds and a drive speed such as a rear axle speed.) Front wheel speeds are projected to the center of gravity, removing yaw and steer angle effects. The longitudinal acceleration is compensated for pitch and yaw, and used to create a fourth speed input. The most appropriate speed signal is used as the reference velocity. The final reference velocity output is rate limited to feasible acceleration values.

Figure 6:
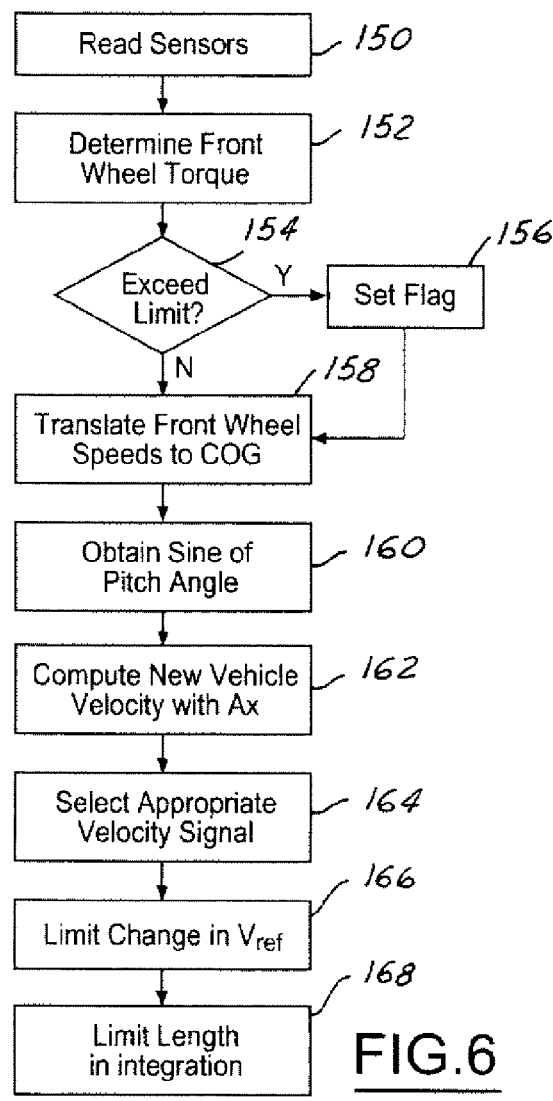
FIG. 6 is a flow chat illustrating a method of determining a reference velocity.
Figure 7:
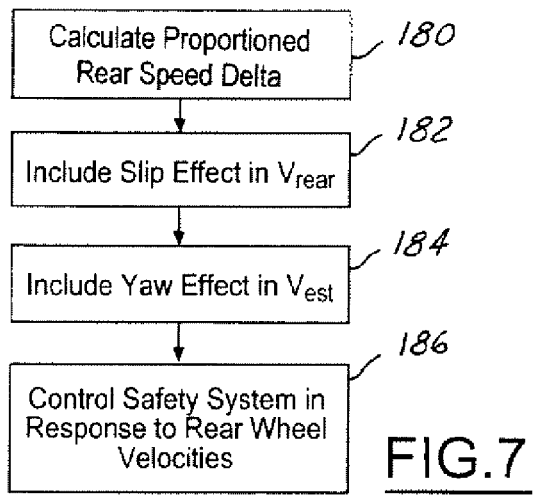
FIG. 7 is a flow chart illustrating a method of determining rear wheel speeds.

Referring now to FIG. 6, a method for determining the reference velocity is illustrated. In step 150, the various calculations by other vehicle controls may be used. The wheel velocities may be determined from the wheel sensors 20A and 20B. The drive speed such as the rear axle velocity is determined by the sensor 20C. Sensor 126 may provide a driveshaft speed which could be used in the following calculations as well. Lateral acceleration 32 and the longitudinal acceleration 36 are also below. Each of the sensor signals may be processed or filtered for being used in the following algorithm. The various normal loads on each of the four corners of the vehicle is determined. The normal load will be determined directly by the vehicle load sensor 58 of FIG. 3 or may be calculated in a manner such as that described in U.S. Pat. No. 6,593,849, which is incorporated by reference herein. The amount of brake torque may also be an input. The steering angle position may be determined from the steering angle position sensor 38. A sine and cosine of the steering angle may also be used. The yaw rate signal from yaw rate sensor 38 may also be used. Various angles such as the roll angle and the global pitch angle are also determined below. Various matters for determining the global pitch and relative roll angle of the vehicle is known.

Step 152 determines if front wheels exceed torque limit. In step 152 a torque limit for each front wheel based on vehicle lateral acceleration and computed normal loading on each wheel is calculated.

$$Tq_{Allow}[i]=K_{TqAllow}*A_y*(N[i]-N_{min})$$

$K_{TqAllow}$ is a constant based on the normal loading factors, rolling radius, and factor of safety
$A_y$ is vehicle lateral acceleration
N is the normal load at the wheel If the brake torque on both wheels exceeds the corresponding torque threshold in step 154, then a flag is set in step 156 indicating high front brake torque. In step 154 if the torque threshold is not exceeded, or in step 156 after the flag is set, step 158 is performed.

In step 158, the front wheel speeds are translated to vehicle center of gravity. Yaw rate and tire steer angle may be used to perform the compensation as in the following:

$$V_{cg}[FL]=(V_{whl}[FL]-(V_{y\_Rear}+WB*\omega_z)*\sin\delta)/\cos\delta+(HT*\omega_z)$$

$$V_{cg}[FR]=(V_{whl}[FR]-(V_{yRear}+WB*\omega_z)*\sin\delta)/\cos\delta-(HT*\omega_z)$$

$V_{whl}$ is the velocity measured at the wheel
$V_{y\_Rear}$ is the lateral velocity estimate at the rear axle
WB is the vehicle wheel base
HT is half of the vehicle track
$\omega_z$ is the vehicle yaw rate
$\delta$ is the average tire steer angle The forward velocity at the center of gravity predicted by the rear velocity measurement does not need compensation. The rear steer angle is zero, and the measurement takes into account both rear wheels such that yaw effects are cancelled out.

In step 160, the pitch angle is obtained by adding the road pitch estimate and the dynamic vehicle pitch estimate. These are calculated in response to longitudinal acceleration, lateral acceleration, roll rate, and yaw rate within the roll stability control system 102 of FIG. 2.

$$\sin\text{Pitch4}RSC\_Vref=(GLOBAL\_PITCH\_ANG)$$

Small angle approximation is used here for the sine of the pitch angle.

Note that global pitch angle currently ramps down during highly dynamic maneuvers. Another potential method is to hold a road pitch angle constant during highly dynamic maneuvers, and add the relative pitch to this road pitch value.

In step 162 another vehicle velocity using longitudinal acceleration reading. The longitudinal acceleration measurement from the longitudinal acceleration sensor 36 is used to compute an estimated new reference velocity signal. The acceleration measurement must be compensated for yaw and gravity effects.

$$V_{ax}=RSC\_V\_Ref+(A_x+(V_y*\omega_z)+(G*\sin\text{Pitch4}RSC\_Vref))*t_{loop}$$

G is acceleration due to gravity
$A_x$ is the longitudinal acceleration read by the sensor
$V_y$ is the vehicle lateral velocity estimate
$t_{loop}$ is the loop time and
RSC_V_Ref is a previously determined reference velocity (post loop)

Note that a high resolution is preferred for $V_{ax}$, since the change over each loop is very small.

In step 164, the velocity signal that is most likely to give an accurate reference velocity is selected. In the following, whether the vehicle is accelerating or decelerating is determined. This may be done directly from the longitudinal acceleration sensor 36.

During Acceleration: The highest value of the undriven wheel velocities (front wheels in this example) is determined. This may be referred to as the maximum front velocity.

During Deceleration: The reliability of the wheel speeds is determined. That is, whether the wheel speeds are reliable, unreliable or if there is conflicting information is used in the determination. The reliability may be based upon such factors as a high front brake torque flag from step 152 and relative roll angle over a particular threshold such as 1 degree.

If wheel speeds are potentially unreliable and if $V_{ax}$ is less than current RSC_V_Ref and if:
VRear is less than current RSC_V_Ref then use the maximum of $V_{ax}$ and all wheel velocities
VRear is greater than current RSC_V_Ref then use the maximum of $V_{ax}$ and front wheel velocities If wheel speeds are potentially unreliable and if $V_{ax}$ is greater than current RSC_V_Ref then the current value of RSC_V_Ref is held.

If wheel speeds are reliable and the maximum front wheel velocity is greater than rear the maximum front velocity is used.

If wheel speeds are reliable and if the rear velocity is less than current RSC_V_Ref then the rear velocity is used.

If conflicting wheel information is present such as when (VRear>RSC_V_Ref, and front wheel velocities<RSC_V_Ref) then:
if a front wheel has very low brake torque and acceleration within tighter bounds the maximum front velocity is used.
or if $V_{ax}$ is predicting low deceleration and $V_{ax}$>maximum front velocity then $V_{ax}$ is used
or if none of the above is true the current RSC_V_Ref is used.

Acceleration may be determined by the maximum front wheel velocity exceeding the current RSC_V_Ref.

Reliability of the wheels speeds for use in calculating RSC_V_Ref is based on comparing the estimated torque to the thresholds previously computed for the front wheels, combined with a threshold for roll of the vehicle. During deceleration, if both front wheels exceed the allowed torque and the vehicle roll is significant, all wheel speed sensors may be reading values that are not indicative of vehicle velocity. Wheel deceleration rates may also be used to check reliability.

In step 166, the change in reference velocity is limited. The change in RSC_V_Ref may be limited to values corresponding to feasible vehicle acceleration to prevent inaccurate results. (Approximately +0.6 g for acceleration, and 1.2 g for deceleration.)

In step 168, the length of integration may be limited in order to prevent integration error from building up. A counter may be used to limit the length of integration. For example, each time the logic uses $V_{ax}$ to determine RSC_V_Ref, the counter is increased by one. If the logic uses a value other than $V_{ax}$ to determine RSC_V_Ref, the counter is decreased by more than one. (A significant correction to the error can be made in each loop.) If the counter ceases the integration, a set number of loops is required before integration can resume. (This allows sufficient correction of potential error.)

Note that parameters may be set to avoid integration timeout, as this may force use of a wheel speed that has significant slip for the RSC_V_Ref determination.

Rear Wheel Velocities

The following estimates the individual rear wheel speeds for a vehicle with only three speed signals. (Two front wheel speeds and a drive speed such as a rear axle speed.) The difference between the reference velocity and the rear speed sensor is used to determine a rear speed delta. The slip that causes this delta is attributed to the lightly loaded wheel during periods of significant roll. For small roll, the rear slip is divided between the two rear wheels in a manner that is proportional to the relative roll angle, allowing the rear wheel speed estimates to be continuous in time.

In step 180 a proportioned rear speed delta is determined. The difference between the RSC_V_REF and the measured rear velocity is determined as a slip effect. The difference is multiplied by a saturated relative roll angle.

$$V_{DELTA\_PROP} = \text{LiMIT}(\theta_{RELATIVE}, -1.0, 1.0) * (V_{REF} - V_{REAR});$$

$\theta_{RELATIVE}$ is the relative roll angle
$V_{REF}$ is the reference velocity
$V_{REAR}$ is the rear measured velocity (compensated for rear axle ratio if required)

It should also be noted that the limit may be determined in response to lateral acceleration.

In step 182 the slip effect on the rear wheel estimates is determined by subtracting the proportioned rear speed delta from the measured rear velocity, the rear left velocity estimate may be determined by:

$$V_{EST}[RL] = V_{REAR} - V_{DELTA\_PROP}$$

Adding the proportioned rear speed delta from the measured rear velocity to get the rear right velocity estimate is determined by:

$$V_{EST}[RR] = V_{REAR} + V_{DELTA\_PROP}$$

Note that this method effectively attributes all rear wheel slip to the inside wheel if $|\theta_{RELATIVE}| > 1°$. In this case, the slip will be twice the slip measured by the rear speed sensor.

In step 184 the yaw effect is used to obtain the final rear wheel estimates. That is, yawing speeds up the outside wheel, and slows down the inside wheel, relative to the measured speed.

$$V_{EST}[RL]V_{EST}[RL] - (HT * \omega_z)$$

$$V_{EST}[RR] = V_{EST}[RR] + (HT * \omega_z)$$

The rear wheel estimates are then used to control a safety system in step 186. For example, the rear wheel velocities may be in the roll stability tracking and control system, the yaw stability control system or anti-lock brake system. In the roll stability control system, the values may be used to determine whether or not a wheel has lifted. Whether the wheel has lifted may be determined as set forth in U.S. Pat. Nos. 6,356,188 and 6,593,849 and U.S. patent application Ser. Nos. 10/608,908, 10/609,448, and 10/604,398, each of which is incorporated by reference herein.

While particular embodiments of the invention have been shown and described, numerous variations and alternate embodiments will occur to those skilled in the art. Accordingly, it is intended that the invention be limited only in terms of the appended claims.

The invention claimed is:

1. A method for controlling a safety system of a vehicle, said method comprising the steps of:
   determining a reference velocity from a first front wheel speed signal, a second front wheel speed signal and a drive speed signal in which said drive speed signal comprises one of an axle speed signal or a driveshaft speed signal;
   calculating a first rear wheel speed value and a second rear wheel speed value from said reference velocity, a slip effect, and a yaw signal; and
   controlling said safety system in response to said first rear wheel speed value and said second rear wheel speed value.

2. A method as recited in claim 1, said method further comprising the step of determining said slip effect in response to a rear velocity and said reference velocity.

3. A method as recited in claim 1, said method further comprising the step of determining said slip effect in response to a rear velocity, said reference velocity, and a limit.

4. A method as recited in claim 3, said method further comprising the step of determining said limit in response to a roll angle.

5. A method as recited in claim 3, said method further comprising the step of determining said limit in response to a lateral acceleration.

6. A method as recited in claim 1, said method further comprising the step of determining said yaw signal in response to a yaw rate.

7. A method as recited in claim 1, wherein the step of controlling said safety system includes controlling a roll stability control (RSC) system.

8. A method as recited in claim 7, wherein controlling said roll stability control (RSC) system includes determining a wheel lift.

9. A method as recited in claim 1, wherein the step of controlling said safety system includes controlling a yaw stability control (YSC) system.

10. A method as recited in claim 1, wherein the step of determining said reference velocity from a first front wheel speed signal, a second front wheel speed signal, and a drive speed signal further comprises the steps of
    determining a reliability of said first front wheel speed signal, said second front wheel speed signal and said drive speed signal; and
    using at least one signal appropriately selected from the group consisting of said first front wheel speed signal, said second front wheel speed signal and said drive speed signal wherein appropriate selection is based on the reliability of said first and second front wheel speed signals and said drive speed signal.

11. A method as recited in claim 1, wherein the step of determining said reference velocity further includes determining said reference velocity in response to a torque limit.

12. A method as recited in claim 11, wherein the step of determining said reference velocity further includes determining said torque limit as a function of a normal load and a lateral acceleration.

13. A method as recited in claim 1, wherein the step of determining said reference velocity further includes determining said reference velocity in response to a pitch angle.

14. A method as recited in claim 1, wherein the step of determining said reference velocity further includes determining said reference velocity in response to a longitudinal acceleration.

15. A method as recited in claim 1, wherein the step of determining said reference velocity further includes determining said reference velocity in response to an updated vehicle velocity that is determined in response to a longitudinal acceleration.

16. A method as recited in claim 1, wherein the step of determining said reference velocity further includes determining said reference velocity in response to an updated vehicle velocity that is determined in response to a longitudinal acceleration and gravity.

17. A method as recited in claim 1, wherein the step of determining said reference velocity further includes determining said reference velocity in response to an updated vehicle velocity that is determined in response to a longitudinal acceleration and said yaw signal.

18. A method as recited in claim 1, wherein the step of determining said reference velocity further includes determining said reference velocity in response to an updated vehicle velocity that is determined in response to a longitudinal acceleration, gravity, and said yaw signal.

19. A method as recited in claim 1, said method further comprising the step of selecting a maximum front wheel velocity during longitudinal acceleration.

20. A method as recited in claim 1, said method further comprising the step of:
during longitudinal deceleration, selecting a maximum of said first front wheel speed signal or said second front wheel speed signal when the front wheel signal is greater than the rear speed or using said rear speed when said rear speed is less than a prior reference velocity.

21. A vehicle comprising:
a safety system;
a first front wheel speed sensor generating a first front wheel speed signal;
a second front wheel speed sensor generating a second front wheel speed signal;
a rear axle speed sensor generating a rear axle speed signal;
a yaw rate sensor generating a yaw rate signal; and
a controller coupled to the first front wheel speed sensor, the second front heel speed sensor and the rear axle speed sensor, said controller determining a reference velocity from the first front wheel speed signal, a second front wheel speed signal and the rear axle speed signal, said controller determining a first rear wheel speed signal and a second rear wheel speed signal from the reference velocity, a slip effect and the yaw signal, said controller controlling the safety system in response to the first rear wheel speed signal and the second rear wheel speed signal.

* * * * *